United States Patent
Chene et al.

(10) Patent No.: US 8,789,941 B2
(45) Date of Patent: Jul. 29, 2014

(54) SPECTACLES FRAME SIDE WITH CHANGEABLE CURVATURE

(76) Inventors: Richard Chene, Neuilly (FR); Alain Miklitarian, Paris (FR); Olivier Rodi, Gambals (FR); Dominique Delamour, Les Mesnuls (FR)

( * ) Notice: Subject to any disclaimer, the term of this patent is extended or adjusted under 35 U.S.C. 154(b) by 68 days.

(21) Appl. No.: 13/809,124

(22) PCT Filed: Jul. 8, 2011

(86) PCT No.: PCT/EP2011/061702
§ 371 (c)(1),
(2), (4) Date: May 21, 2013

(87) PCT Pub. No.: WO2012/004406
PCT Pub. Date: Jan. 12, 2012

(65) Prior Publication Data
US 2013/0235329 A1   Sep. 12, 2013

(30) Foreign Application Priority Data

Jul. 9, 2010 (FR) ..................... 10 02906

(51) Int. Cl.
*G02C 5/16* (2006.01)
*G02C 5/18* (2006.01)
*G02C 5/20* (2006.01)
(52) U.S. Cl.
CPC ... *G02C 5/20* (2013.01); *G02C 5/18* (2013.01)
USPC ......................... 351/114; 351/123

(58) Field of Classification Search
USPC .................. 351/114, 123, 121, 111, 115, 117
See application file for complete search history.

(56) References Cited

U.S. PATENT DOCUMENTS

| | | | | |
|---|---|---|---|---|
| 4,012,130 A | * | 3/1977 | Guillet | 351/114 |
| 4,037,946 A | * | 7/1977 | Blumenthal | 351/114 |
| 5,076,681 A | * | 12/1991 | Lhospice | 351/115 |
| 5,422,685 A | * | 6/1995 | Conway | 351/114 |
| 6,036,310 A | | 3/2000 | Moetteli | |

FOREIGN PATENT DOCUMENTS

| | | |
|---|---|---|
| EP | 0 698 801 A1 | 2/1996 |
| EP | 2 096 485 A1 | 9/2009 |
| WO | WO 2008/109849 A2 | 9/2008 |

OTHER PUBLICATIONS

International Search Report of PCT/EP2011/061702, mailed Aug. 5, 2011, 11 pages.

* cited by examiner

*Primary Examiner* — Hung Dang
(74) *Attorney, Agent, or Firm* — Klein, O'Neill & Singh, LLP

(57) ABSTRACT

The side (1) includes an articulation front end (2) adapted to be articulated to a frame front face via a hinge (5) and a free rear end (3), a core (6) extending inside the side. One of the front and rear ends of the core (6) is anchored (8) in one of the front and rear ends of the side and the side includes, fixed to it, driving and shaping means (11, 16) for driving the other of the ends of the core, movably mounted in the other of the ends of the side and to deform the side and thus to modify its contour and curvature.

6 Claims, 3 Drawing Sheets

SPECTACLES FRAME SIDE WITH CHANGEABLE CURVATURE

This is a U.S. National Phase of PCT/EP2011/061702, filed Jul. 8, 2011, which claims the benefit of priority to FR 1002906, filed Jul. 9, 2010, which is incorporated herein by reference.

FIELD OF THE INVENTION

The field of the invention is that of spectacle frames.

BACKGROUND OF THE INVENTION

A spectacle frame includes a frame front and two sides articulated to the frame front by means of hinges.

A frame side includes a core on which it is formed. This may be a cable or, more rigidly, a rod, or a shank, to employ the term of art.

A spectacle frame side is generally curved.

The applicants have had the idea of seeking to modify the contour of spectacle frame sides at will and reversibly to adapt them better to the head of users and to improve their comfort.

SUMMARY OF THE INVENTION

Accordingly, the invention concerns a spectacle frame side including an articulation front end adapted to be articulated to a frame front face via a hinge and a free rear end, a core extending inside the side, characterized in that one of the front and rear ends of the core is anchored in one of the front and rear ends of the side and the side includes, fixed to it, driving and shaping means for driving the other of the ends of the core, movably mounted in the other of the ends of the side and to deform the side and thus to modify its contour.

Thanks to the driving means fastened to the side the core can therefore be shortened relative to the side, with the effect of curving the side or increasing its contour.

The mobile end of the core is preferably externally threaded to cooperate with an internally threaded sleeve of the driving and shaping means of the side also including a thumbwheel for driving the sleeve in rotation.

The driving means may be disposed in the articulation front end or in the free rear end of the side.

The core preferably extends in a channel formed in the side and along which are provided spaced shaping bridges under which the core extends.

The side advantageously includes at least one stiffened local area preventing modification of the contour in one plane to enable it orthogonally to that plane.

In this case, variation of the contour of the side is therefore globally possible in three dimensions.

BRIEF DESCRIPTION OF THE DRAWING

The invention will be better understood in the light of the following description of embodiments of the spectacle frame side of the invention given with reference to the appended drawing, in which.

DETAILED DESCRIPTION OF PREFERRED EMBODIMENT

Figure 1:
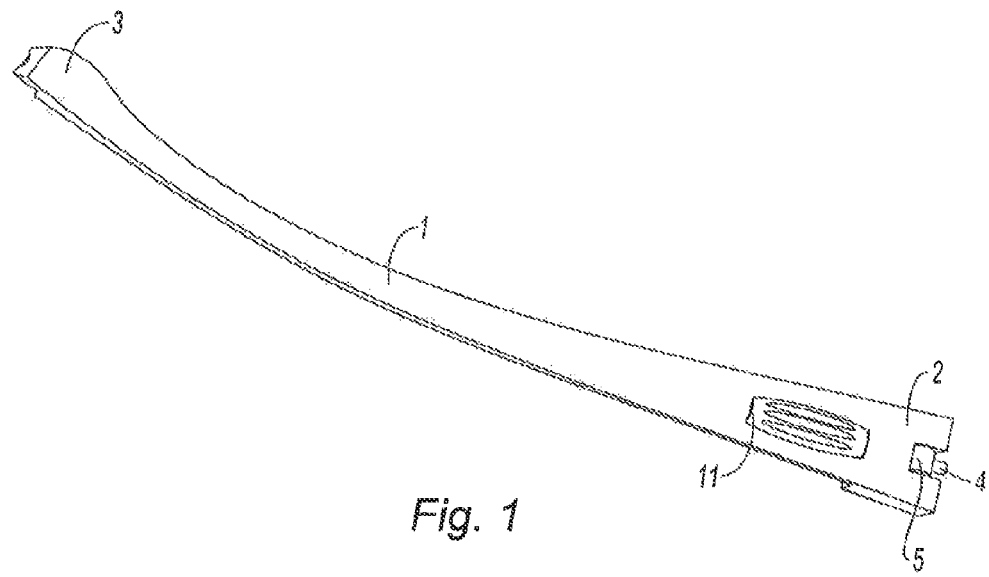
FIG. 1 is a perspective view of the exterior of a first embodiment of the side of the invention.
Figure 2:
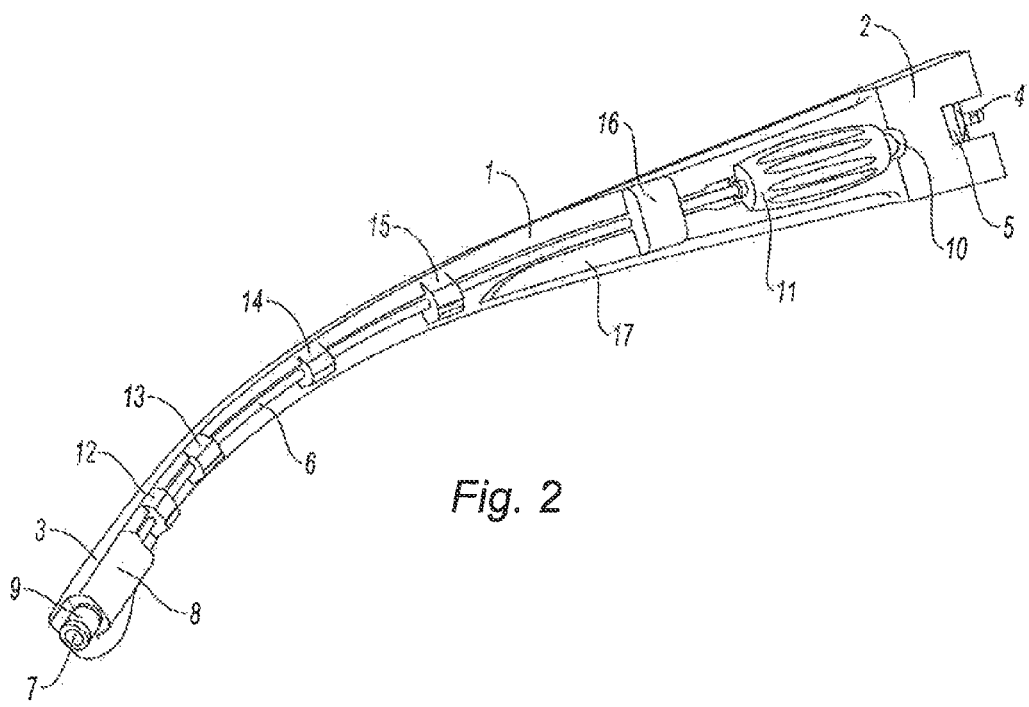
FIG. 2 is a perspective view of the interior of the side from FIG. 1.

The side 1 from FIGS. 1 and 2 includes an articulation front end 2 and a free rear end 3. The end 2 is intended to be articulated by means of a tenon element 4 of a hinge 5 to a lateral tenon of a spectacle frame front face. The free end 3 is intended to rest on an ear of a user. A core 6 extends "inside", here to be more precise along the side 1 between the two ends 2, 3.

The core 6 is anchored by its rear end 7 in the free rear end 3 of the side 1. To be more precise, the core 6 extends through an end tunnel 8 of the rear end 3 of the side and its end 7 is crimped into a stop pin 9 abutted against the end tunnel 8, at the free end of the side.

Near its other end 10 the core 6 is externally threaded and screwed into an internally threaded sleeve accommodated in an adjustment thumbwheel 11 intended to drive the sleeve in rotation.

Immobilized in translation in the thumbwheel 11, when the sleeve is driven in rotation, it draws the core 6 by its externally threaded end in translation through it and the thumbwheel. The effect of this driving of the core 6 is to shorten the length of the core between the anchor tunnel 8 and the shortening thumbwheel 11.

The core 6 thus extends along the side 1 but passing under spaced bridges for shaping the side, here five sides 12-16 between the anchor tunnel 8 and the shortening thumbwheel 11 these bridges forming a channel in which the core extends. The spacing of the pairs of bridges increases from the tunnel 8 to the thumbwheel 11. Thanks to the bridges, the core 6 remaining stretched between them, because of the shortening of its length, the bridges are moved closer together in pairs which causes shaping or deformation of the side, which becomes curved or more curved.

Between the bridges 15 and 16 there is formed a lower rib 17 that extends parallel to the core 6, under it, from the bridge 16 toward the bridge 15, and which stops slightly short. This rib 17 is a stiffening rib that prevents the side from curving in the general plane of this rib between the two bridges 15 and 16. The contour of the side 1 can be modified only in the portion between the two bridges that extend beyond the rib and also in the end part of this rib that ends in a rounded tip.

Figure 5:
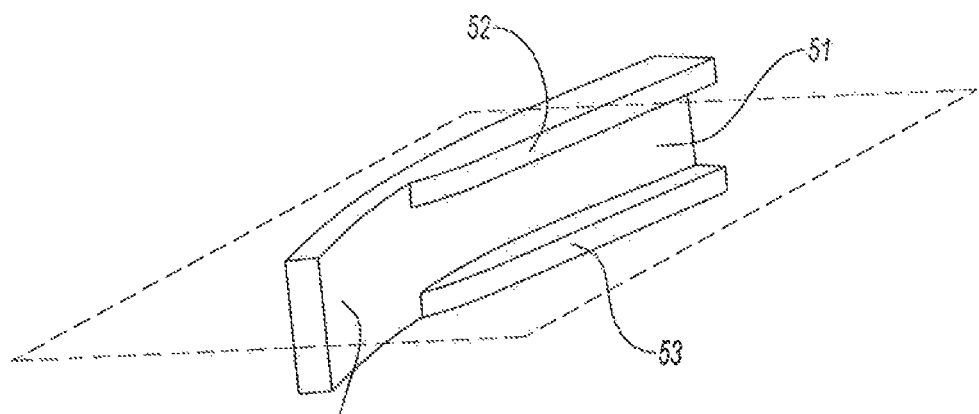
FIG. 5 is a perspective view of the interior of a portion of a third embodiment of the side of the invention.
Figure 6:
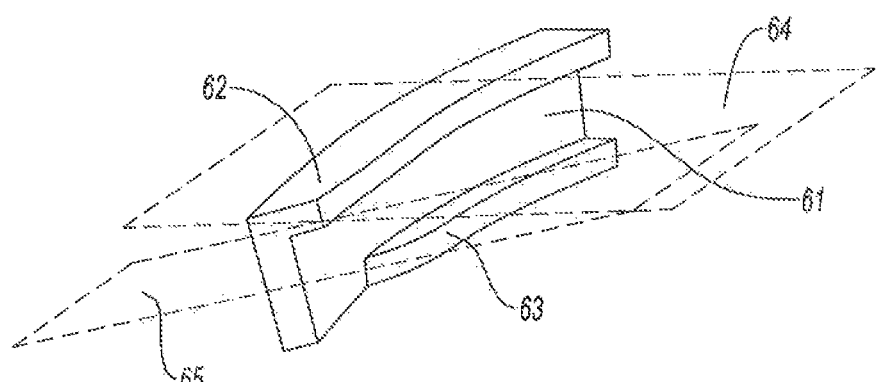
FIG. 6 is a perspective view of the interior of a portion of a fourth embodiment of the side of the invention.

Turning to FIG. 5, a portion of the side 51 is provided with two stiffener ribs 52, 53 at its edges, between which the core of the side extends. These two ribs 52, 53 extend over the same distance and thus prevent any modification of the contour in their plane so that it is allowed only beyond them (at 54) and in the three directions in space, but rather and as much in the plane orthogonal to the plane of the ribs, as shown at 55 in the figure, Similarly, referring to FIG. 6, in the portion represented the side 61 includes a first edge rib 62 that extends the whole length of this portion and a second edge rib 63 that extends over only a part of this portion, as in the FIG. 5 example. Accordingly, just as in the preceding example, relative modification of the curvature of the temple 61 can occur in a plane 64 orthogonal to the plane of the ribs but, given the dissymmetry of the ribs, also by composition of the forces that could be exerted, in a plane 65 inclined to the plane 64.

Figure 3:
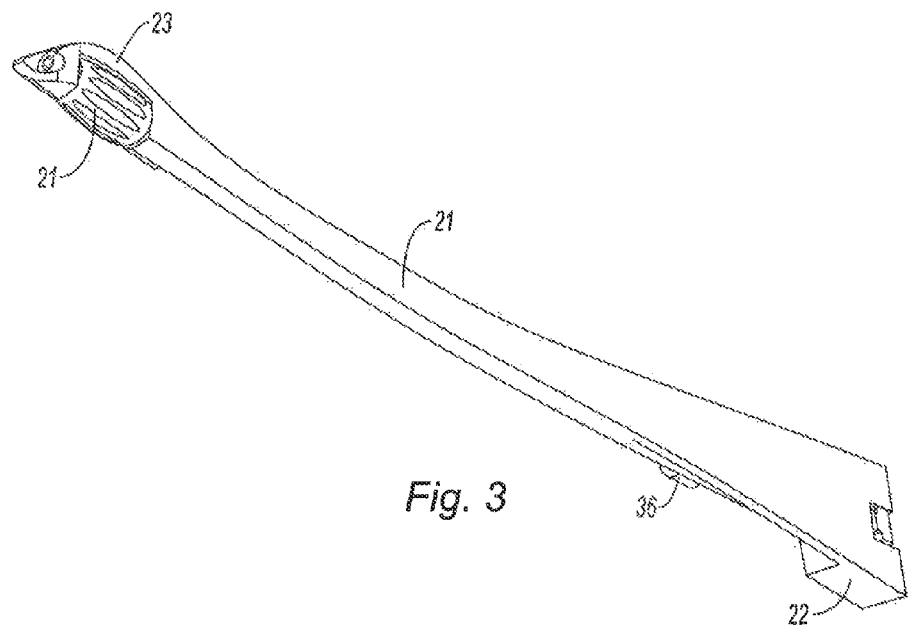
FIG. 3 is a perspective view of the exterior of a second embodiment of the side of the invention.
Figure 4:
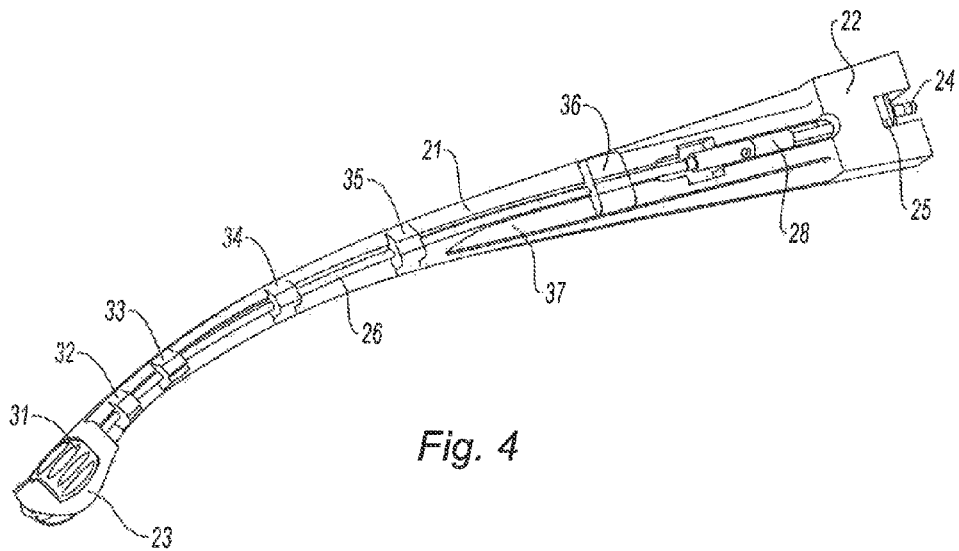
FIG. 4 is a perspective view of the interior of the side from FIG. 3.

The embodiment of the side 21 from FIGS. 3 and 4 differs from that from FIGS. 1 and 2 by interchanging of the anchorage and the adjustment thumbwheel. On the side 21, the adjustment thumbwheel 31 is disposed at the free rear end 23 and the anchor tunnel 28 in the vicinity of the articulation front end 22 of the temple. As for the rest, elements of the side 21 identical to those of the side 1 are referenced in an homologous manner, only the tens digit being changed.

Accordingly, the core 26 extends between a rotatable sleeve in the thumbwheel 31 and the anchor tunnel 28, extending under the bridges 32-36, a stiffening rib 37 being provided at the edge of the temple between the bridges 35 and 36.

It will be noted that the core of the side may be more or less flexible or rigid. The more rigid the core, the smaller the deviation created between the rectilinear core and the arc of the side. Moreover, it will be noted that the curvature of the side depends on the distances between two successive bridges.

The invention claimed is:

1. A spectacle frame side including an articulation front end adapted to be articulated to a frame front face via a hinge and a free rear end, a core extending inside the side, characterized in that one of the front and rear ends of the core is anchored in one of the front and rear ends of the side and the side includes, fixed to it, driving and shaping means for driving the other of the ends of the core, movably mounted, to move in the other of the ends of the temple and to deform the side and thus to modify its contour.

2. A frame side as claimed in claim 1, wherein the rear end of the core is anchored in the free rear end of the side, the driving means being disposed in the articulation front end of the side.

3. A frame side as claimed in claim 1, wherein the rear end of the core is movably mounted in the free rear end of the side, the driving means being disposed in the free rear end of the side.

4. A frame side as claimed in claim 1, wherein the mobile end of the core is externally threaded to cooperate with an internally threaded sleeve of the driving and shaping means of the side also including a thumbwheel for driving the sleeve in rotation.

5. A frame side as claimed in claim 1, wherein the core extends in a channel formed in the side and along which are provided spaced shaping bridges under which the core extends.

6. A frame side as claimed in claim 1, wherein there is provided at least one stiffened local area preventing modification of contour in one plane to enable it orthogonally to that plane.

* * * * *